Patented Oct. 23, 1934

1,978,083

UNITED STATES PATENT OFFICE 1,978,083

SULPHUR DYES, AND PROCESS OF MAKING SAME

Raymond W. Hess, Buffalo, N. Y., assignor to National Aniline & Chemical Company, Inc., New York, N. Y., a corporation of New York No Drawing. Application October 30, 1929, Serial No. 403,665

24 Claims. (Cl. 260—19)

The invention relates to sulphur dyes and to a process for making such dyes, and includes correlated improvements and discoveries whereby and wherewith the properties of the sulphur dyes are enhanced. Material dyed with the new dyes forms a part of the invention.

An object of the invention is to provide a process for the production of sulphur dyes from an indophenol and a polysulphide which shall give an increased yield of dye with greater efficiency and with reduction in the cost of manufacture.

Another object of the invention is to provide a process for the production of sulphur dyes whereby the quantity of sulphur remaining in the finished dye is materially reduced, thus obviating dilution of the dye and liability to cause fire in the grinding mills.

Other objects of the invention are to produce a blue sulphur dye which is soluble in aqueous sodium sulphide and which dyes material blue shades from a sodium sulphide bath, and to provide as an article of manufacture material dyed blue shades with such a sulphur dye.

Other objects of the invention will in part be obvious and will in part appear hereinafter.

The particular method to which this invention relates is that wherein an indophenol is heated with a polysulphide in the presence of a solvent, e. g., water, alcohol, etc. which polysulphide may be prepared by dissolving sulphur in alkali metal monosulphide or in caustic alkali. At the end of the sulphuration the dye is present in the sulphuration mass in a form which may be considered as being the reduced or leuco dye suspended or dissolved in the sulphide solution. The dye may be isolated from the sulphuration mass or melt by one of several methods, for example, by diluting the sulphuration melt and aerating the diluted melt to oxidize and precipitate the dye, or by addition of a mineral acid to the melt. The sulphide present at the end of the sulphuration is decomposed, resulting in the precipitation of some free sulphur along with the dye.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the present invention use may be made of a polysulphide not lower than the pentasulphide of an alkali-forming metal in the sulphuration of an indophenol of the following probable formula:

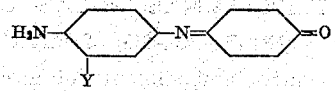

wherein Y represents hydrogen or an alkyl group, and wherein the benzene nuclei may contain substituents other than halogen to obtain new sulphide soluble dyes. The dyes so produced are, in the dry form, dark blue powders, soluble in caustic alkali, soluble in concentrated sulphuric acid with a blue solution, and difficultly soluble in cold aqueous sodium sulphide solution with an olive color which does not change on boiling, and from which solution unmordanted cotton is dyed in shades varying from gray to olive, which turn blue on exposure to the air.

Further the dyes obtained according to the invention have a higher tinctorial value than the dyes which may be made in a similar manner from the above mentioned intermediate but in the preparation of which a sulphide lower than the pentasulphide, for example tetrasulphide, has been utilized.

Preferably, the amount of sulphur and alkali used, and the proportion of the resulting polysulphide employed to that of indophenol, is such that at the end of the sulphuration there is present a sulphide which corresponds approximately to the tetrasulphide. Upon decomposing this tetrasulphide, as for example, by blowing air through the solution, a decomposition takes place, probably according to the following equation:

(1) 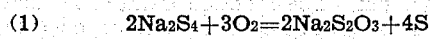

resulting in the precipitation of an excessive amount of free sulphur along with the dye. In a similar manner, free sulphur is also precipitated by decomposition of sulphides higher or lower than the tetrasulphide upon blowing air through a sulphuration melt or solution which contains the same. While the presence of small quantities of free sulphur in the dye is not objectionable, although undesirable, the quantity of free sulphur thus introduced into the dye may become prohibitive.

The present invention provides for the elimination of an excess of sulphur from sulphur dyes prepared by heating a sulphur dye intermediate with the polysulphide of an alkali-forming metal, preferably in such proportions that at the end of the sulphuration the unreacted polysulphide is present in a form corresponding approximately to a tetrasulphide, by dissolving or holding in solution the sulphur liberated by the decomposition of the sulphide. This may be accomplished by the addition of an alkali to the sulphuration melt at the completion of the sulphuration either before, after or during the decomposition of the sulphide if the method of decomposition by aeration is used. When the sulphide is decomposed by acid, it may be added after decomposition of the sulphide and is followed by aeration. By blowing the diluted sulphuration melt with air, in the presence of an alkali (the term "alkali" is meant to include alkali metal hydroxide, alkali metal carbonate and alkali metal monosulphide, all of which have an alkaline reaction), the sulphur liberated according to Equation (1) reacts with the alkali and oxygen to form thiosulphate. The following three equations show the probable reaction of sulphur with caustic soda, sodium carbonate and sodium sulphide respectively.

(2)   $6NaOH + 6S + 3O_2 = 3Na_2S_2O_3 + 3H_2O$ (3)   $Na_2CO_3 + 2S + O_2 = Na_2S_2O_3 + CO_2$ (4)   $2Na_2S + 2S + 3O_2 = 2Na_2S_2O_3$

As illustrative embodiments of a manner in which the invention may be practiced the following examples are given: The parts are by weight.

Example 1

*Sulphuration.*—A polysulphide is prepared by mixing together 667 parts ground sulphur and 356 parts caustic soda as a concentrated solution, in a sulphuration kettle equipped with an agitator and a reflux condenser. The mixture is heated to a temperature of about 90° to 95° C. to aid the solution of the sulphur in the caustic liquor.

180 parts of an indophenol in the form of a 30 per cent paste and having the following probable formula:

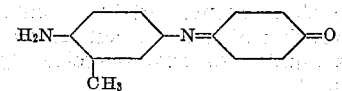

is then slowly added to the polysulphide solution at 100° to 110° C., about 15 to 20 minutes being required for the addition. The charge, which corresponds to 3.5 mols $Na_2S_6$ per mol of indophenol, is then heated to vigorous boiling and the boiling point adjusted to 115° C. by evaporating off water or by adding water thereto as conditions may necessitate. Agitation is carried on throughout the sulphuration. The reaction mixture is then boiled at 115° C. for about 10 to 12 hours, or until a test shows the absence of indophenol. Heating is continued for a short time after the disappearance of the indophenol to insure complete reaction.

It will be realized that the time required for the completion of the sulphuration is dependent not only on the temperatures employed, but also upon the rate at which the reaction mass is boiled. The temperatures preferably utilized are those from about 105 to 120° C. and the rate of boiling is such that the time required to complete the sulphuration ranges from about 5 to 25 hours.

*Isolation.*—The sulphuration melt thus obtained is diluted with 10,000 parts water and a concentrated solution containing 267 parts caustic soda is gradually added thereto while the melt is being aerated, until the dye is substantially all precipitated, after which it is filtered, washed and dried.

The dye, when dry, is a dark blue powder soluble in concentrated sulphuric acid with a blue solution, slightly soluble in caustic alkali solution, soluble in aqueous sodium sulphide solution with an olive coloration from which solution it dyes unmordanted cotton in gray to olive shades which, upon exposure to the atmosphere, are oxidized to blue.

Example 2

*Sulphuration.*—A polysulphide is prepared from 386 parts fused sodium sulphide (containing 60 per cent $Na_2S$), 230 parts water and 476 parts ground sulphur. 180 parts of the indophenol described in Example 1, in the form of a paste containing 30 per cent indophenol is then added at 100° to 105° C. during a period of about 15 to 20 minutes. The charge which corresponds to 3.5 mols $Na_2S_6$ per mol of indophenol, is heated to simmering temperature which is adjusted to 110° C. by evaporating water or by adding water thereto as the conditions may necessitate. Heating at simmering temperature (i. e., just under or at the boiling point) is continued until a test shows the absence of indophenol. About 16 to 18 hours are required for the reaction to go to completion.

*Isolation.*—The sulphuration melt, after completion of the sulphuration, is diluted with 8,000 to 10,000 parts water and the resulting solution is aerated until precipitation of the dye is completed. The mixture is then heated to 80° to 90° C. and 255 parts soda ash is added. Aeration is then continued at this temperature until the sulphur is substantially dissolved, about 8 to 9 hours being required. The dye obtained is filtered and dried. Its properties correspond to those of the dye produced in Example 1 except that the dyeings on cotton are a more greenish shade of blue.

As above indicated, the polysulphide may be prepared by dissolving free sulphur in sodium sulphide, in which case the polysulphide is formed probably according to the following equation:

(5)   $Na_2S + (x-1)S = Na_2S_x$ or it may be prepared by dissolving free sulphur in caustic soda in which case the polysulphide is formed probably according to the following equation:

(6)   $6NaOH + (2x+2)S = 2Na_2S_x + Na_2S_2O_3 + 3H_2O$ wherein $x$ is 5 or greater. There is some indication that in the presence of caustic soda in excess of that required in Equation (6) to form the tetrasulphide, the tetrasulphide nevertheless will be formed at first leaving the excess of caustic unreacted on. It is also possible that in the presence of sulphur in excess of that required in Equations (5) and (6) to form the tetrasulphide, a higher polysulphide may not be formed, but the excess sulphur becomes dissolved or suspended in the polysulphide formed. Therefore, the expression "polysulphide" throughout the specification and claims, is used to designate the formula $Na_2S_x$ without regard to whether the sulphur represented by the symbol $S_x$ is chemically combined to form a true compound, or is partly combined, or is partly suspended or dissolved in the alkali or polysulphide or is present in any other form. The expression "sulphur ratio of the polysulphide" refers to the value $x$.

An increase in yield results from the use of polysulphides higher than the pentasulphide, which increase I am unable definitely to explain.

The theory I advance, but to which theory it will be understood my invention is not limited, is that the more effective sulphurizing agent is a solution or suspension of sulphur in sodium tetrasulphide. Therefore, in the sulphuration, I use sufficient sulphur together with the alkali so that at the end of the sulphuration the sulphide remaining will be present in a form corresponding approximately to the tetrasulphide. In this way it is possible to maintain at all times in the sulphuration melt a polysulphide corresponding to or higher than the tetrasulphide.

When sodium sulphide and sulphur are used as the sulphurizing agent, the proportion of sulphurizing agent to indophenol for a fixed weight of indophenol can be calculated from Equation (5). When caustic soda and sulphur are used as the sulphurizing agent, the proportion of sulphurizing agent to indophenol for a fixed weight of indophenol can be calculated from Equation (6). It is readily apparent that if tetrasulphide is present at the end of the sulphuration, and if this tetrasulphide is to be decomposed in or during the precipitation of the dye, it is desirable to have present at the end of the sulphuration as little polysulphide as possible in order to avoid the presence of an excessive amount of free sulphur in the dye precipitated. On the other hand, when the proportion of polysulphide to indophenol becomes too low, the sulphuration mass loses its homogeneity and it becomes difficult to duplicate results. Between these two limits lie the preferred conditions of operation.

In order to obtain maximum yields of dye it is also necessary to provide sufficient available sulphur, i. e., sulphur above that needed to form $Na_2S_4$, the thiosulphate sulphur not being available, for the sulphuration melt so that the reaction may go substantially to completion. It follows, therefore, that the lower the proportion of polysulphide to indophenol used, the higher will be the sulphur ratio of the polysulphide needed and the higher the proportion of polysulphide to indophenol used, the lower will be the sulphur ratio of the polysulphide needed. The sulphur ratio of the polysulphide multiplied by the ratio of the mols polysulphide to mols indophenol need not necessarily be constant, but I prefer to have present about 7 atomic proportions of available sulphur per mol of indophenol. I may use a polysulphide corresponding to a composition higher than $Na_2S_5$ up to $Na_2S_{10}$ or higher. The upper limit will be determined by operating considerations.

As pointed out in Example 1, the isolation of the dye is preferably carried out by gradually adding the alkali, when caustic alkali is used, to the diluted sulphuration melt, while it is being aerated. According to Example 2, the preferred procedure is to aerate the diluted melt to precipitate the dye, then add alkali, when sodium carbonate is used, to the resulting mixture heated to about 80°–90° C. and aerate further at this temperature to re-dissolve the sulphur which has been precipitated. The process for the re-solution of the sulphur is not limited to the temperature specified, although the action of alkalis, particularly of soda ash, on sulphur is more rapid at elevated temperatures. However, the sulphur is held in solution during the subsequent step of filtration. The quantity of alkali used for holding the sulphur in solution is such that it will react with the free sulphur which would be precipitated if no alkali were used at this stage of the process. This quantity will vary depending on the kind of alkali used and can be calculated from Equation (1) in conjunction with Equations (2), (3) and (4). If desired, only a part of the free sulphur need be removed.

Since certain changes in carrying out the above process, and certain modifications in the composition which embody the invention may be made without departing from its scope, it is intended that all matter contained in the above description shall be interpreted as illustrative and not in a limiting sense. It will be understood that the process of removing or eliminating excess sulphur from sulphur dye melts is not limited to the treatment of the particular sulphur dyes disclosed in the examples, nor to the treatment of sulphuration melts containing any particular composition of polysulphide.

In the specification and claims, the word "sulphide" is used to generically include either the monosulphide or polysulphide unless otherwise stated.

I claim:

1. A process for the production of a sulphur dye soluble in aqueous sodium sulphide, which comprises heating an indophenol having the composition represented by the general formula

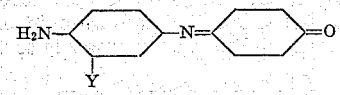

wherein Y may represent hydrogen or an alkyl group, and wherein the benzene nuclei may contain substituents other than halogen, with sulphur and an alkali in proportions corresponding to a polysulphide not lower than the pentasulphide, the amount of sulphur being such that at the end of the sulphuration unreacted polysulphide is present in the form of a polysulphide not lower than the tetrasulphide.

2. A process for the production of a sulphur dye soluble in aqueous sodium sulphide, which comprises heating an indophenol having the composition represented by the general formula

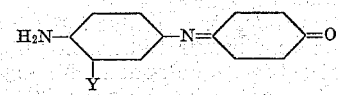

wherein Y may represent hydrogen or an alkyl group, and wherein the benzene nuclei may contain substituents other than halogen, with sulphur and caustic soda in proportions corresponding to a polysulphide not lower than that represented by the formula $Na_2S_5$, the amount of sulphur being such that at the end of the sulphuration unreacted sodium polysulphide is present in a form not lower than the tetrasulphide.

3. A process for the production of a sulphur dye soluble in aqueous sodium sulphide, which comprises heating an indophenol having the composition represented by the general formula

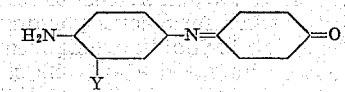

wherein Y may represent hydrogen or an alkyl group, and wherein the benzene nuclei may contain substituents other than halogen, with a higher polysulphide of an alkali-forming metal than the tetrasulphide in such proportions that at the end of the sulphuration unreacted polysulphide is present in a form corresponding approximately to the tetrasulphide.

4. A process for the production of a sulphur dye soluble in aqueous sodium sulphide, which comprises heating an indophenol having the composition represented by the general formula

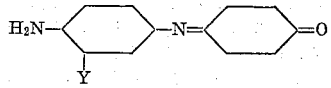

wherein Y may represent hydrogen or an alkyl group, and wherein the benzene nuclei may contain substituents other than halogen with an amount of an alkali-metal polysulphide higher than the tetrasulphide equivalent to about 7 atomic proportions of sulphur, in excess of that present as tetrasulphide, per mol of indophenol.

5. A process for the production of a sulphur dye soluble in aqueous sodium sulphide, which comprises heating an indophenol having the composition represented by the formula

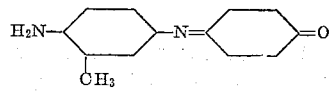

with sulphur and a caustic alkali in such proportions that at the end of the sulphuration unreacted alkali metal polysulphide is present in a form corresponding approximately to the tetrasulphide.

6. A process for the production of a sulphur dye soluble in aqueous sodium sulphide, which comprises heating an indophenol having the composition represented by the formula

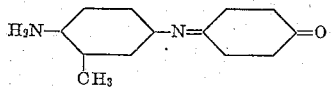

with an alkali metal polysulphide not lower than the pentasulphide, the amount of sulphur being such that at the end of the sulphuration unreacted alkali metal polysulphide is present in the form of a polysulphide not lower than the tetrasulphide.

7. A process for the production of a sulphur dye soluble in aqueous sodium sulphide, which comprises heating an indophenol having the composition represented by the formula

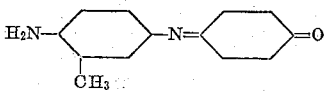

with sulphur and caustic soda in such proportions that the reaction mixture will correspond to approximately 3.5 mols $Na_2S_6$ per mol of indophenol.

8. A process for the production of a sulphur dye, which comprises heating an indophenol with a higher polysulphide of an alkali-forming metal than the tetrasulphide in such proportions that at the end of the sulphuration unreacted sulphide is present in a form corresponding approximately to a tetrasulphide, whereby a solution containing the sulphur dye and the sulphide is produced, and decomposing the sulphide by oxidation to precipitate the dye in the presence of an alkali in an amount sufficient to hold substantially all of the liberated sulphur in solution.

9. In the production of a sulphur dye by a process which comprises heating an indophenol with a polysulphide of an alkali forming metal, to produce a solution containing the sulphur dye and a sulphide of the alkali forming metal, and decomposing the sulphide to precipitate the dye, whereby free sulphur is liberated, the improvement which comprises oxidizing the liberated sulphur in the presence of an alkali in an amount sufficient to dissolve substantially all of the liberated sulphur, and separating the precipitated dye from the resulting solution.

10. In the production of a sulphur dye by a process which comprises heating an indophenol having the composition represented by the general formula

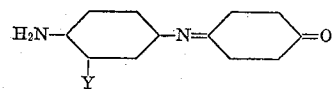

where Y may represent hydrogen or an alkyl group, and wherein the benzene nuclei may contain substituents other than halogen, with a polysulphide of an alkali forming metal, to produce a solution containing the sulphur dye and a sulphide of the alkali forming metal, and decomposing the sulphide to precipitate the dye, whereby free sulphur is liberated, the improvement which comprises oxidizing the liberated sulphur in the presence of an alkali in an amount sufficient to dissolve substantially all of the liberated sulphur, and separating the precipitated dye from the resulting solution.

11. In the production of a sulphur dye by a process which comprises heating an indophenol with an alkali metal polysulphide, to produce a solution containing the sulphur dye and a sulphide of the alkali metal, and decomposing the sulphide to precipitate the dye, whereby free sulphur is liberated, the improvement which comprises oxidizing the liberated sulphur in the presence of an alkali selected from the group consisting of sodium hydroxide, sodium carbonate and sodium sulphide in an amount sufficient to dissolve substantially all of the liberated sulphur, and separating the precipitated dye from the resulting solution.

12. A process for the production of a sulphur dye, which comprises heating an indophenol with a higher polysulphide of an alkali-forming metal than the tetra-sulphide in such proportions that at the end of the sulphuration unreacted sulphide is present in a form corresponding approximately to the tetrasulphide, whereby a solution containing the sulphur dye and the sulphide is produced, and decomposing the sulphide by oxidation to precipitate the dye in the presence of sufficient caustic soda to hold the liberated sulphur in solution.

13. A process for the production of a sulphur dye, which comprises heating an indophenol having the composition represented by the general formula

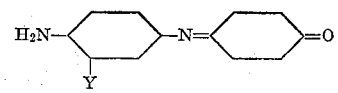

wherein Y may represent hydrogen or an alkyl group, and wherein the benzene nuclei may contain substituents other than halogen, with a higher polysulphide of an alkali-forming metal than the tetrasulphide in such proportions that at the end of the sulphuration the unreacted sulphide is present in a form corresponding approximately to the tetrasulphide, whereby a solution containing the sulphur dye and the sulphide is produced, and decomposing the sulphide by oxidation to precipitate the dye in the presence of sufficient 14. A process for the production of a sulphide soluble sulphur dye which comprises heating an indophenol having the composition represented by the formula:

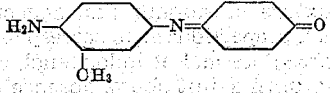

with sulphur and caustic soda in such proportions as to correspond to 3.5 mols $Na_2S_6$ per mol of indophenol, diluting the melt with water, aerating the diluted melt to decompose the remaining polysulphide and precipitate the dye, and adding sufficient caustic soda to the diluted melt during aeration to maintain the liberated sulphur in solution.

15. In the production of a sulphur dye by a process which comprises heating an indophenol with a polysulphide, whereby a solution containing the sulphur dye and a sulphide is produced, the improvement which comprises decomposing the remaining sulphide by oxidation to precipitate the dye in the presence of sufficient caustic soda to hold substantially all of the liberated sulphur in solution.

16. As a new composition of matter the sulphur dye which is obtainable by heating an indophenol having the composition represented by the general formula

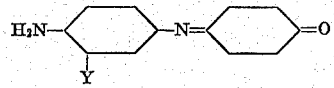

wherein Y may represent hydrogen or an alkyl group, and wherein the benzene nuclei may contain substituents other than halogen, with a polysulphide of an alkali forming metal not lower than the pentasulphide, and which, in the dry state, is a dark blue powder, soluble in concentrated sulphuric acid with a blue solution, slightly soluble in caustic alkali solution, difficultly soluble in cold aqueous sodium sulphide solution with an olive color which remains unchanged on boiling, and which dyes unmordanted cotton, from a sodium sulphide solution, shades varying from gray to olive, which turn blue on exposure to the air.

17. In the production of a sulphur dye by a process which comprises heating an indophenol with a polysulphide of an alkali-forming metal, whereby a solution containing the sulphur dye and a sulphide of an alkali-forming metal is produced, the improvement which comprises aerating the solution in the presence of sufficient alkali to retain substantially all of the liberated sulphur in solution while the sulphur dye is precipitated.

18. A process for the production of a sulphur dye, which comprises heating an indophenol with a higher polysulphide of an alkali metal than the tetrasulphide in such proportions that at the end of the sulphuration unreacted sulphide is present in a form corresponding approximately to the tetrasulphide, whereby a solution containing the sulphur dye and the sulphide is produced, oxidizing the sulphide to precipitate the dye, whereby sulphur is liberated, adding an alkali in an amount sufficient to convert substantially all of the liberated sulphur to a thiosulphate upon oxidation, oxidizing the liberated sulphur in the resulting mixture to the thiosulphate, and then separating the precipitated dye from the resulting solution.

19. A process for the production of a sulphur dye, which comprises heating an indophenol having the composition represented by the general formula

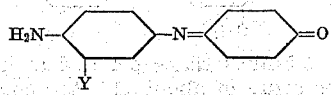

where Y may represent hydrogen or an alkyl group, and wherein the benzene nuclei may contain substituents other than halogen, with a higher polysulphide of an alkali metal than the tetrasulphide in such proportions that at the end of the sulphuration unreacted sulphide is present in a form corresponding approximately to a tetrasulphide, whereby a solution containing the sulphur dye and the sulphide is produced, aerating the solution to precipitate the dye and decompose the sulphide, whereby free sulphur is liberated, adding an alkali selected from the group consisting of sodium hydroxide, sodium carbonate and sodium sulphide in an amount sufficient to convert substantially all of the liberated sulphur to sodium thiosulphate, aerating the resulting mixture to oxidize the liberated sulphur to sodium thiosulphate, and then separating the precipitated dye from the resulting solution.

20. In the production of a sulphur dye by a process which comprises heating an indophenol with an alkali metal polysulphide to produce a solution containing the sulphur dye and a sulphide of the alkali metal, the improvement which comprises oxidizing the sulphide to precipitate the dye in the presence of an alkali in an amount sufficient to hold in solution substantially all of the sulphur thereby liberated.

21. A process for the production of a sulphur dye soluble in aqueous sodium sulphide, which comprises heating at a temperature of about 105° to about 120° C. an indophenol having the composition represented by the formula

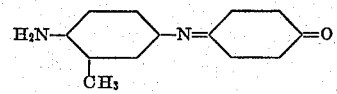

with an aqueous solution of a sodium polysulphide higher than the tetrasulphide in such proportions that at the end of the sulphuration unreacted sodium polysulphide is present in a form corresponding approximately to the tetrasulphide, continuing the heating until a test shows absence of the indophenol, and then recovering the resulting dyestuff.

22. A process for the production of a sulphur dye soluble in aqueous sodium sulphide, which comprises simmering at a temperature of about 110° C. a reaction mixture containing an indophenol having the composition represented by the formula

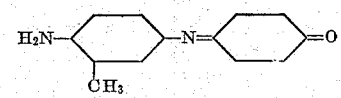

and an aqueous solution of about 3.5 mols $Na_2S_6$ per mol of indophenol, continuing the simmering until a test shows absence of the indophenol, and then recovering the resulting dyestuff.

23. A process for the production of a sulphur dye soluble in aqueous sodium sulphide, which comprises heating an aqueous mixture of an indophenol having the composition represented by the formula

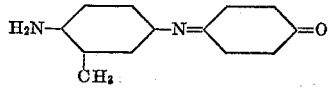

and about 3.5 mols Na₂S₆ per mol of indophenol to a temperature of about 110° to about 115° C., adjusting the quantity of water in the reaction mixture to correspond with a boiling point of about 110° to about 115° C., boiling the resulting reaction mixture at said temperature until a test shows absence of the indophenol, and then recovering the resulting dyestuff.

24. A process for the production of a sulphur dye soluble in aqueous sodium sulphide, which comprises boiling at a temperature of about 110° to about 115° C. an indophenol having the composition represented by the formula

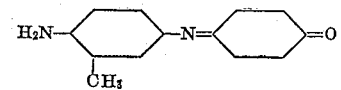

with a mixture of sulphur and aqueous caustic soda in such proportions as to correspond to about 3.5 mols Na₂S₆ per mol of indophenol, continuing the boiling until a test shows absence of the indophenol, diluting the resulting reaction mass with water, whereby a solution containing the sulphur dye and sodium polysulphide is produced, decomposing the polysulphide and precipitating the dye by aeration and addition of an alkali in an amount sufficient to render soluble substantially all of the liberated sulphur, and separating the precipitated dyestuff from the remaining solution.

RAYMOND W. HESS.